(12) United States Patent
Montero Montes de Oca et al.

(10) Patent No.: US 9,387,761 B2
(45) Date of Patent: Jul. 12, 2016

(54) INSTRUMENT PANEL DISPLAY POINTER WITH A MOTOR AND RING GEAR

(71) Applicant: Continental Automotive Systems, Inc., Auburn Hills, MI (US)

(72) Inventors: Salvador Montero Montes de Oca, Zapopan (MX); Daniel Alejandro Laguna Chavez, Zapopan (MX); Jose Arturo Sanchez Lopez, Guadalajara (MX)

(73) Assignee: Continental Automotive Systems, Inc., Auburn Hills, MI (US)

( * ) Notice: Subject to any disclaimer, the term of this patent is extended or adjusted under 35 U.S.C. 154(b) by 88 days.

(21) Appl. No.: 14/457,606

(22) Filed: Aug. 12, 2014

(65) Prior Publication Data
US 2016/0046187 A1    Feb. 18, 2016

(51) Int. Cl.
*G08B 21/00*   (2006.01)
*B60K 35/00*   (2006.01)

(52) U.S. Cl.
CPC .......... *B60K 35/00* (2013.01); *B60K 2350/1064* (2013.01)

(58) Field of Classification Search
CPC ...................................................... B60K 35/00
USPC ........ 340/461, 438, 441, 459, 688; 368/23.01
See application file for complete search history.

(56) References Cited

U.S. PATENT DOCUMENTS

| | | |
|---|---|---|
| 7,262,689 B2 * | 8/2007 | Kolpasky ...................... 340/461 |
| D683,645 S | 6/2013 | Bode et al. |
| 2012/0127180 A1 | 5/2012 | Wang et al. |

OTHER PUBLICATIONS http://www.torquenews.com/image/tft-gauge-cluster-2013-cadillac-xts-awd-premium.
http://my-meego.com/downloads/search.php?name=Velocimeter.
Speedometer celebrates 110 years—Autotrade.ie.
Picture of Analogue Instrument Digital Display.
Picture of Velocimeter.
Picture 2013 Cadillac XTS SWD TFT Gauge Cluster.

* cited by examiner

*Primary Examiner* — Jeffery Hofsass

(57) ABSTRACT

An instrument panel display pointer having an electronic display and range display. The electronic display rotates with the pointer allowing the pointer to point to a face cover that is mounted to the base. The face cover has values that in one example are indicative of a range of values. Examples of value range would include vehicle speed, RPMs, gallons or liters of fuel remaining, etc. The electronic display is used to display a number which indicates a more precise value, while the pointer indicates a value within a range of values shown on the face of the cover. As the pointer rotates with the ring gear to a different speed, the electronic display pointer also changes the value shown on the electronic display.

20 Claims, 4 Drawing Sheets

INSTRUMENT PANEL DISPLAY POINTER WITH A MOTOR AND RING GEAR

FIELD OF THE INVENTION

The present invention is related to an instrument panel display pointer providing both range and digital displays.

BACKGROUND OF THE INVENTION

In the field of automotive instrumentation, there is typically an instrument display panel located around the steering wheel. The instrument display panel typically contains several gauges or electronic displays that indicate various vehicle conditions such as vehicle speed, rotations per minute (RPM), temperature, oil pressure, fuel, etc. The type of display is usually either an electronic display showing a numeric or graphical image value relating to one of the aforementioned parameters. Another type of display involves a range gauge type of display where there is a range of values and a pointer that points to a specific value. For example, for engine speed, a gauge or a dial shows a number value or range of speeds going from zero to one hundred sixty kilometers per hour with various speed increments in between. A pointer then moves along the range of values indicating the current speed value. In an electronics display, a speedometer would show or display a numerical value for the exact speed that the vehicle is traveling without any indication of the range of values on a gauge.

The same can be true for a tachometer, fuel level indicator, or other displays. In a tachometer for example, an electronic display will state what the precise RPM is a given point of time, while a range type of gauge will use a needle that shows the approximate RPM value within a range of values. While knowing an exact numerical value is helpful as provided by an electronic display, it is also helpful to know where the numerical value falls within a specific range for a given vehicle gauge as provided by an analog display. It is therefore desirable to provide a vehicle instrument panel display pointer that provides both range and electronic or digital displays for a certain parameter.

SUMMARY OF THE INVENTION

The present invention relates to an instrument panel display pointer having a base with at least three mounts connected to the base. Each of the three mounts has two discs connected to a shaft and spaced apart to create a channel for receiving a ring gear that is held by the three mounts and rotatably connected to the base. The ring gear is connected to a motor that is also connected to the base. Activation of the motor rotates the ring gear thereby moving a pointer that is formed on the ring gear. Also connected to the ring gear is an electronic display that has a display panel. A flexible cable is connected at a first end to the electronic display and is configured to rotate with the ring gear. The flexible cable is connected at a second end to a printed circuit board that is connected to the base and supplies electrical signals and power to the electronic display in order to cause a value to be displayed on the electronic display. The electronic display rotates with the pointer allowing the pointer to point to a face cover that is mounted to the base. The face cover has values that in one example are indicative of a range of values. Examples of value ranges would include vehicle speed, RPMs, gallons or liters of fuel remaining, etc. The electronic display is used to display a number which indicates a more precise value, while the pointer indicates a value within a range of values shown on the face of the cover. As the pointer rotates with the ring gear to a different location, the electronic display also changes the value shown on the electronic display.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
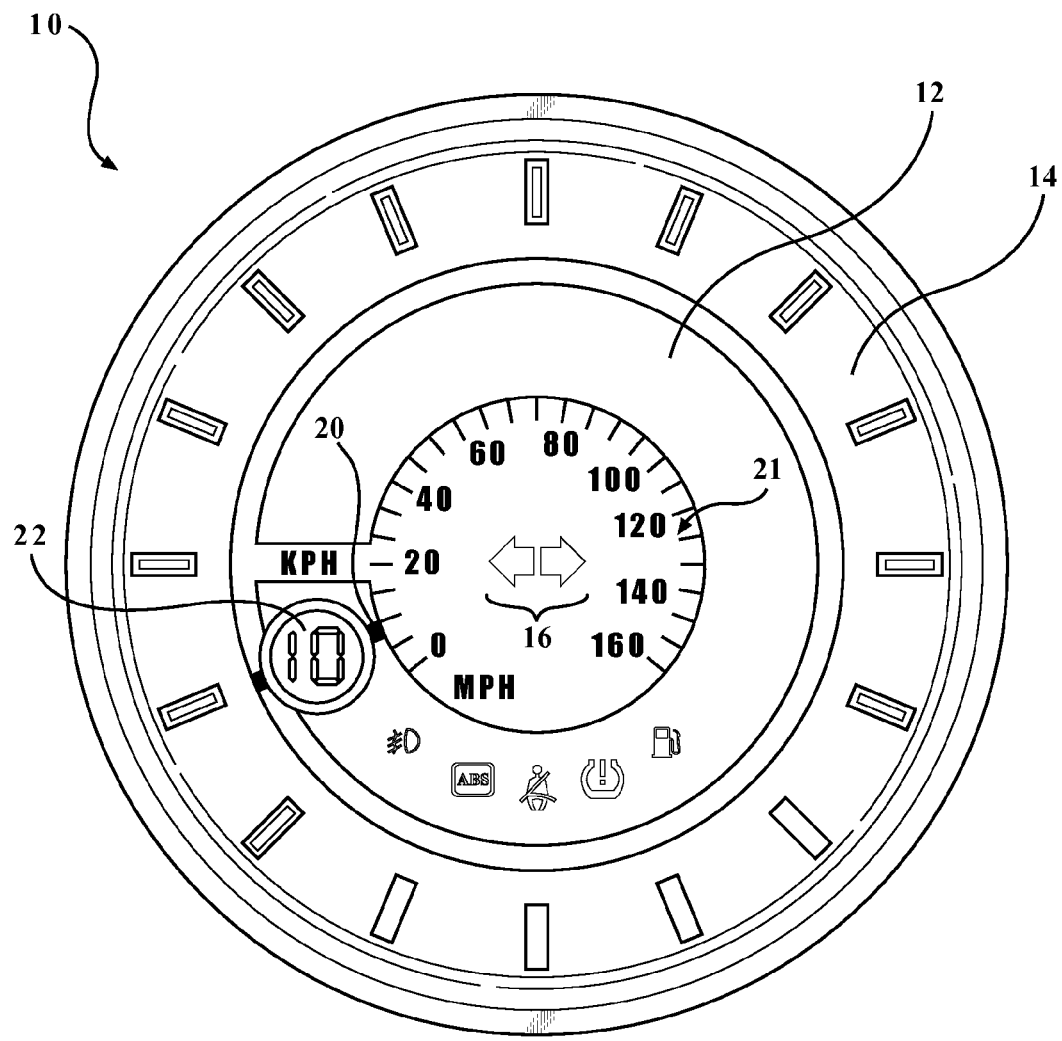
FIG. 1 is a front plan view of the instrument panel display pointer in accordance with one embodiment of the present invention.
Figure 2:
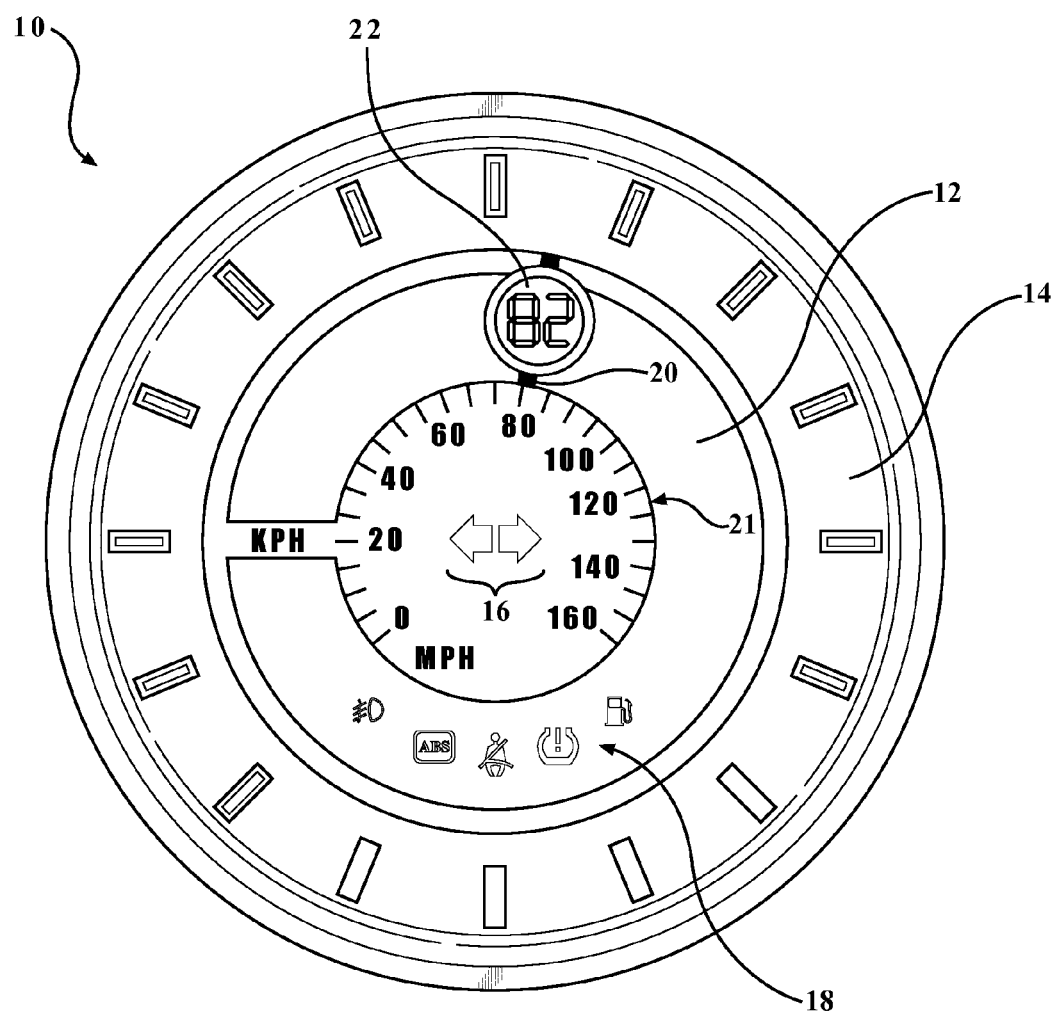
FIG. 2 is a second front plan view of the instrument panel display pointer in accordance with the present invention.

Referring now to the drawings and with specific reference to FIG. 1 and FIG. 2, an instrument panel display pointer 10 is shown. The instrument panel display pointer 10 as shown in FIG. 1 includes a face cover 12 and ring cover 14. The face cover 12 has several different indicia displayed thereon. In the particular embodiment shown in FIGS. 1 and 2, the instrument panel display pointer 10 is part of a speedometer which shows a range display 21 of kilometers per hour (kph) ranging from 0 to 160, with increments of twenty kph being shown. The face cover 12 also includes a left and right turn signal 16 and a number of other lights 18 including a low fuel, low tire pressure, fasten seatbelt, ABS, and high beam indicator lights.

A pointer 20 is movable in a circumferential direction around the face cover 12 and points to a specific value located between 0 kph to 160 kph. The instrument panel display pointer also has an electronic display 22 located adjacent the pointer 20. The electronic display 22 indicates a specific value number that increases, which is indicative of the exact speed of the vehicle. As the pointer 22 moves from a first location as shown in FIG. 1, where the pointer 20 is pointing at an area that is approximately 10 kph, the electronic display 22 displays a number ten. In FIG. 2, the pointer 20 is pointing to a value just above 80 kph, at which time the electronic display shows an exact speed value of 82 kph. As demonstrated by the embodiments shown in FIGS. 1 and 2, the instrument panel display pointer 10 provides a user with an indication of a range of values (e.g., minimum and maximum speed values for the vehicle), while also providing a digital value for the speed, which is an exact value. This allows users of the instrument panel display pointer to get a feel for what range they are operating in using the pointer 20 and range display 21, while also being able to see an exact number on the electronic display 22.

The instrument panel display pointer 10 as shown in FIGS. 1 and 2 is particularly helpful in a speedometer application where a driver may want to instantly know their exact speed and can quickly look at the electronic display 22 instead of having to look at the pointer 20 and then use additional logic to determine exactly what speed the pointer 20 is at. The instrument panel display pointer 10 further provides the advantage of allowing a driver to quickly glimpse at the range display 21 and see where the pointer 20 is located within the range to provide a rough idea of the vehicle speed without having to focus on the number shown on the electronic display 22. While the instrument panel display pointer 10 shown in FIGS. 1 and 2, show a speedometer embodiment of the invention and is within the scope of this invention for the instrument panel display pointer 10 to be modified to be used in applications other than a speedometer. For example, the instrument panel display pointer 10 can be a fuel gage, tachometer, oil pressure indicator, engine temperature indicator, or any other suitable gauge connected to the vehicle.

Figure 3:
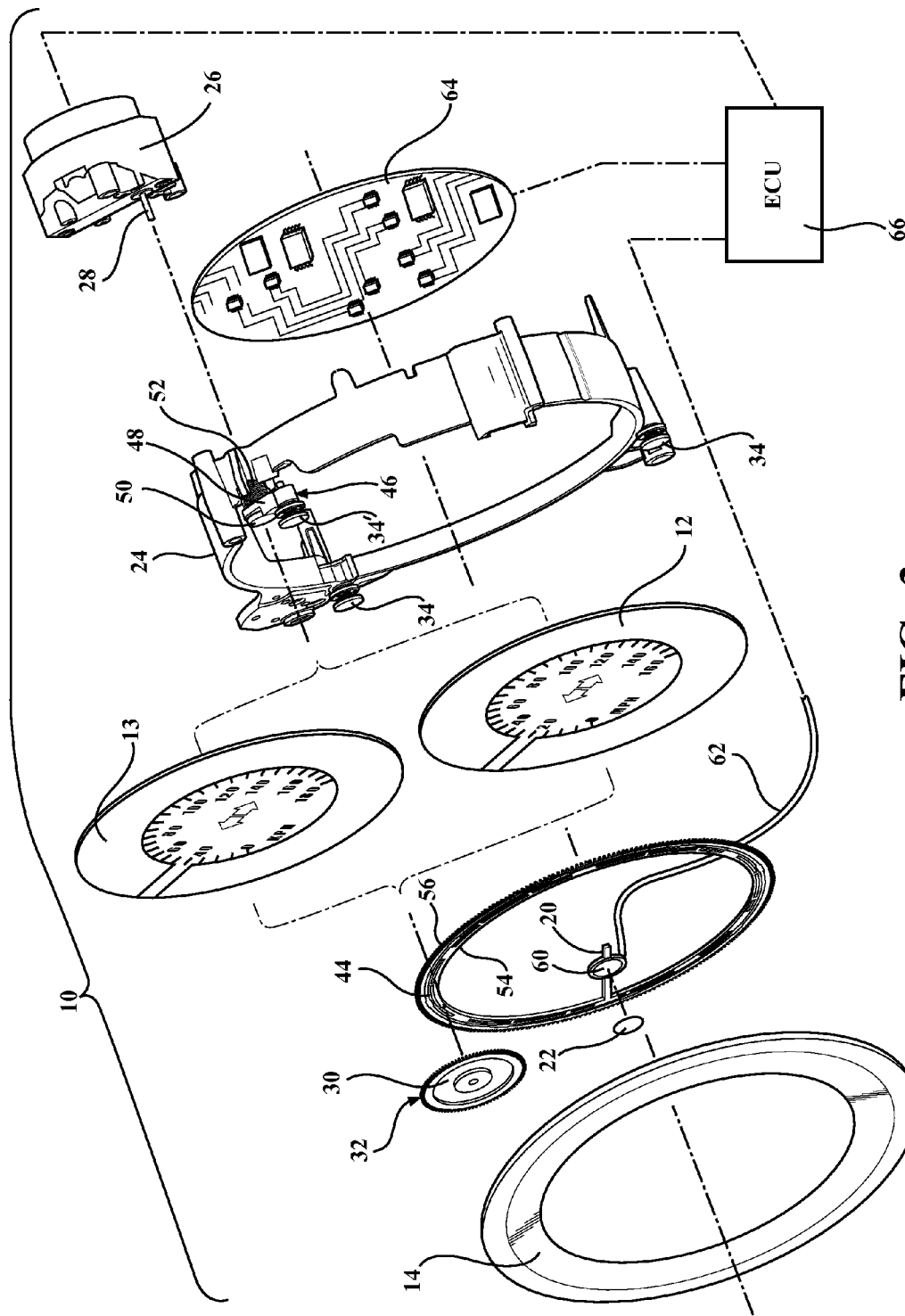
FIG. 3 is an exploded side perspective view of the instrument panel display pointer in accordance with the present invention.

FIG. 3 shows an exploded side perspective view of the various components of the instrument panel display pointer 10 connected to an external Electronic Control Unit (ECU) 66 in accordance with the present invention. As shown in FIG. 3, the instrument panel display pointer 10 has a base 24 which is shown to have a circular cylindrical shape. The base 24 may be made out of metal; however, in the present embodiment of the invention, the base 24 is formed of light weight plastic material. A motor 26 is connected to the base 24. The motor 26 may be a stepper motor having a shaft 28 and pinion gear 30 having teeth 32 formed thereon.

Figure 4:
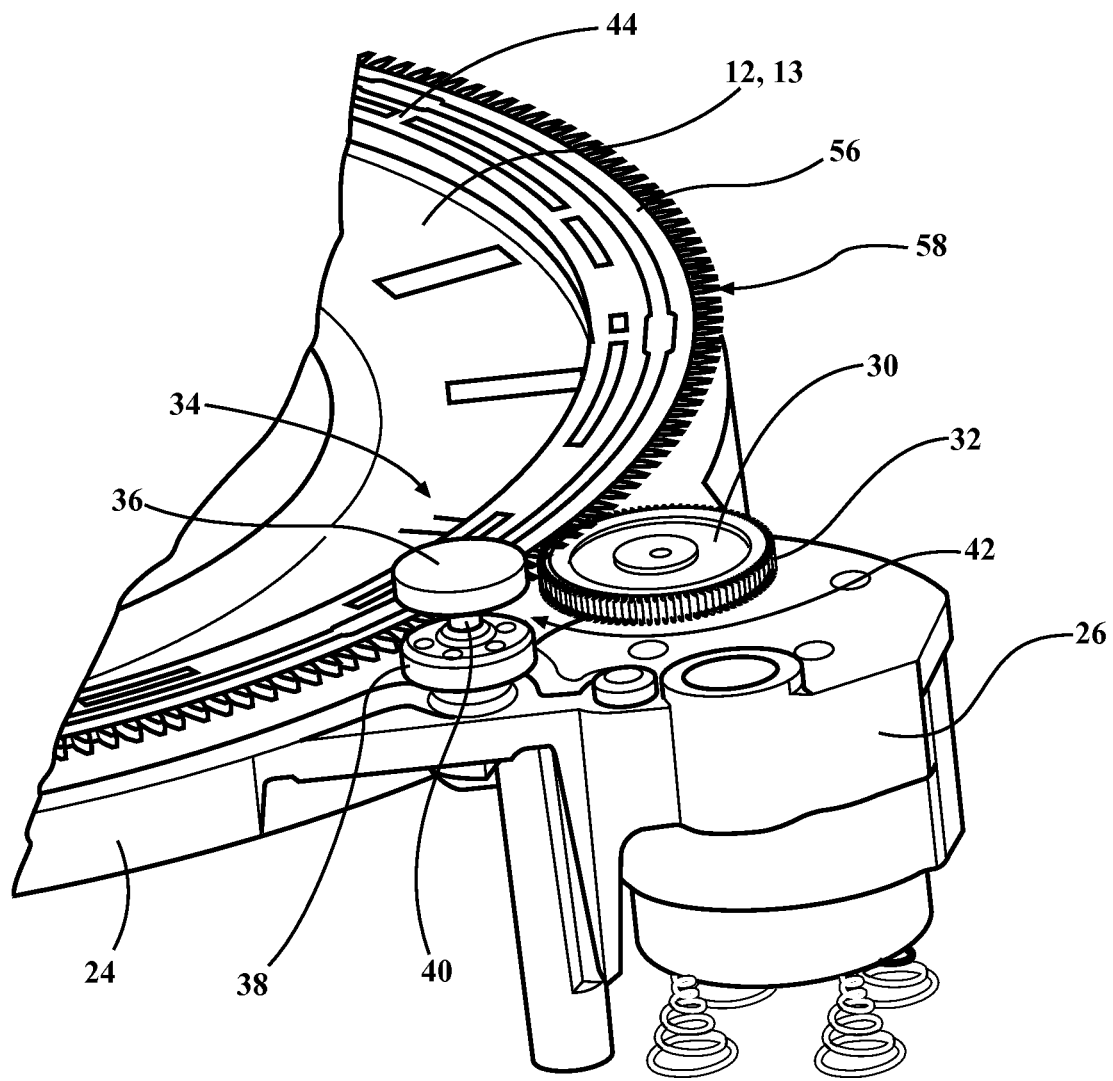
FIG. 4 is an enlarged perspective view of a portion of the instrument panel display pointer.

Referring to FIGS. 3 and 4, the base 24 has mounts 34, 34' formed on an edge surface of the base 24. Each of the mounts 34, 34' has two discs 36, 38 connected by a shaft 40, which is connected to the base 24. The two discs 36, 38 are on the shaft 40 to form a channel 42. A ring gear 44 is rotatably connected to the base 24 and is held to the base 24 by the mounts 34, 34'. The ring gear 44 is configured to rotate within the channel 42 of the mounts 34, 34'. The present embodiment of the invention shows at least three mounts 34, 34', however, depending on the size of the ring gear 44, it is within the scope of this invention for there to be a greater or lesser number of mounts 34, 34' that are used to hold the ring gear.

For assembly purposes, one of the three mounts 34' is connected to a spring loaded pivot arm 46. The spring loaded pivot arm 46 includes an arm 48 connected to the base 24 using a pivot point connection 50. A spring 52, or any suitable resilient member, is connected between the arm 48 and the base 24 to bias the mount 34' and arm 48 toward engagement with the ring gear 44 when the ring gear is placed within the channel 42. During assembly, the spring loaded pivot arm 46 is moved away from the housing allowing for the ring gear 44 to be slid into position, and then the spring 52 urges the mount 34 and arm 48 to engage the ring gear 44.

The ring gear 44 has an inner edge 54 and outer edge 56. In the present embodiment of the invention, teeth 58 are formed on the outer edge of the ring gear 44 and are configured to engage with teeth 32 of the pinion gear 30, so that when the motor 26 is actuated, the shaft 28 rotates the pinion gear 30 thereby causing the pinion gear 30 to rotate and translate the rotative force from the pinion gear 30 to the ring gear 44 through the meshed engagement of teeth 32 with teeth 58. While the teeth 58 are formed on the outer edge 56 of the ring gear 44, it within the scope of this invention for the teeth 44 to be formed on the inner edge 54, thereby reversing the connection of the pinion gear 30 with the ring gear 44 so that the pinion gear 30 contacts teeth on the inner edge 54 and not the outer edge 56.

The pointer 20 is formed on the inner edge 54 of the ring gear 44 and extends toward the center of the ring gear 44. Activation of the motor 26 rotates the ring gear 44 causing the pointer 20 to move when the ring gear is rotated. Adjacent the tip of the pointer 20 is a mount surface 60 that is configured to receive the electronic display 22. The electronic display 22, when connected at the mount 60, rotates with the ring gear 44 when the ring gear 44 rotates. The electronic display 22 includes a screen capable of displaying a selectable value, such as the kilometer per hour number shown in FIGS. 1 and 2. This is accomplished using a liquid crystal display; however, it is within the scope of this invention for other types of displays to be used, including, but not limited to organic light emitting diodes (OLED), light emitting diodes (LED), or other suitable displays.

In order to control the number or value displayed on the electronic display 22, a flexible cable 62 is connected to the electronic display 22 at a first end and to a circuit board 64 at a second end. The circuit board 64 is connected to the base 24; however, it is possible for the circuit board 64 to not be connected to the base. The circuit board 64 supplies power and control signals through the flexible cable 62 to the electronic display 22, causing the electronic display 22 to display a value. In the present embodiment of the invention, the first end of the flexible cable 22 is connected to the electronic display 22 through the mount 60 on the ring gear 44. However, it is within the scope of this invention for the flexible cable 62 to be connected directly to the electronic display 22 without passing through the mount 60 on the ring gear.

In another aspect of the invention, instrument panel display pointer 10 has an engine control unit 66 (ECU) electrically connected to the circuit board 64. The ECU 66 is connected to other vehicle systems and controls the value and power signals sent to the circuit board 64.

The instrument panel display pointer 10 also includes the face cover 12, which has a number of different indicia, including a number value range 21, left and right turn signals 16, and other indicia 18. In another aspect of the invention, shown in FIG. 3, a second side 13 of the face cover 12 has writing, which allows the face cover to be flipped and reversed for other uses. For example, the second side 13 may have miles per hour (mph) number value ranges shown, while the first side has the kilometers per hour (kph) as shown in FIGS. 1 and 2. If the instrument panel display pointer 10 will be used in a region where miles per hour (mph) will be used instead of kilometers per hour (kph), the face cover 12 can be flipped so that the second side 13 is located directly beneath the pointer 20. The instrument panel display pointer 10 also has a ring cover 14 that circumscribes a portion of the ring gear 44 so that only the pointer 20 and electronic display 22 are seen when the instrument panel display pointer 10 is operating.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An instrument panel display pointer comprising:
a base having at least three mounts;
a motor connected to said base;
a ring gear rotatably connected with and held to the base by the at least three mounts, wherein said ring gear is connected to the motor so that activation of said motor rotates said ring gear and said ring gear has a pointer that moves when said ring gear is rotated;
an electronic display mounted to the ring gear that rotates with the ring gear when the ring gear rotates; and a flexible cable connected to the electronic display and configured to rotate with said ring gear.

2. The instrument panel display pointer of claim 1, wherein one of the at least three mounts is connected to a spring loaded pivot arm.

3. The instrument panel display pointer of claim 1, wherein each one of the at least three mounts has two discs connected to a shaft and spaced apart to create a channel for said ring gear to rotate within.

4. The instrument panel display pointer of claim 1, wherein the motor is a stepper motor having a shaft and pinion gear configured to mesh with gear teeth formed on a circumferential surface of said ring gear.

5. The instrument panel display pointer of claim 1 further comprising a circuit board mounted to said base and electrically connected to an engine control unit, wherein said flexible cable is connected to said printed circuit board.

6. The instrument panel display pointer of claim 1, wherein said electronic display has a liquid crystal display.

7. The instrument panel display pointer of claim 1 further comprising a face cover connected to said housing and positioned under said pointer so that said pointed rotates above and around an edge of said face cover.

8. The instrument panel display pointer of claim 7, wherein said face cover has a first side having a range of values printed on said first side and a second side having a second range of values printed on said second side, wherein as said pointer rotates above and around said edge of said face cover, said pointer will point at a select one of said range of values printed on said first side or said second side of said face cover depending upon which said first side or said second side of said face cover is located is under said pointer.

9. An instrument panel display pointer comprising:
a base having at least three mounts;
a motor connected to said base;
a ring gear rotatably connected with and held to the base by the at least three mounts, wherein said ring gear is connected to the motor so that activation of said motor rotates said ring gear and said ring gear has a pointer that moves when said ring gear is rotated;
an electronic display mounted to the ring gear that rotates, wherein said electronic display has a liquid crystal display;
a flexible cable connected to the electronic display and configured to rotate with said ring gear; and
a circuit board mounted to said base and electrically connected to an engine control unit, wherein said flexible cable is connected to said printed circuit board.

10. The instrument panel display pointer of claim 9, wherein one of the at least three mounts is connected to a spring loaded pivot arm.

11. The instrument panel display pointer of claim 9, wherein each one of the at least three mounts has two discs connected to a shaft and spaced apart to create a channel for said ring gear to rotate within.

12. The instrument panel display pointer of claim 9, wherein the motor is a stepper motor having a shaft and pinion gear configured to mesh with gear teeth formed on a circumferential surface of said ring gear.

13. The instrument panel display pointer of claim 9 further comprising a face cover connected to said housing and positioned under said pointer so that said pointed rotates above and around an edge of said face cover.

14. The instrument panel display pointer of claim 13, wherein said face cover has a first side having a range of values printed on said first side and a second side having a second range of values printed on said second side, wherein as said pointer rotates above and around said edge of said face cover, said pointer will point at a select one of said range of values printed on said first side or said second side of said face cover depending upon which said first side or said second side of said face cover is located is under said pointer.

15. An instrument panel display pointer comprising:
a base having at least three mounts;
a motor connected to said base;
a ring gear rotatably connected with and held to the base by the at least three mounts, wherein one of said at least three mounts is connected to a spring loaded pivot arm and each one of said at least three mounts has two discs connected to a shaft and spaced apart to create a channel so that said ring gear rotates within said channel and said ring gear is connected to the motor so that activation of said motor rotates said ring gear and said ring gear has a pointer that moves when said ring gear is rotated;
an electronic display mounted to the ring gear that rotates with the ring gear when the ring gear rotates; and
a flexible cable connected to the electronic display and configured to rotate with said ring gear.

16. The instrument panel display pointer of claim 15, wherein the motor is a stepper motor having a shaft and pinion gear configured to mesh with gear teeth formed on a circumferential surface of said ring gear.

17. The instrument panel display pointer of claim 15 further comprising a circuit board mounted to said base and electrically connected to an engine control unit, wherein said flexible cable is connected to said printed circuit board.

18. The instrument panel display pointer of claim 15, wherein said electronic display has a liquid crystal display.

19. The instrument panel display pointer of claim 15 further comprising a face cover connected to said housing and positioned under said pointer so that said pointed rotates above and around an edge of said face cover.

20. The instrument panel display pointer of claim 19, wherein said face cover has a first side having a range of values printed on said first side and a second side having a second range of values printed on said second side, wherein as said pointer rotates above and around said edge of said face cover, said pointer will point at a select one of said range of values printed on said first side or said second side of said face cover depending upon which said first side or said second side of said face cover is located is under said pointer.

* * * * *